United States Patent

[11] 3,585,452

| [72] | Inventor | Anatole J. Goodwin<br>Willowdale, Ontario, Canada |
|---|---|---|
| [21] | Appl. No. | 733,840 |
| [22] | Filed | June 3, 1968 |
| [45] | Patented | June 15, 1971 |
| [73] | Assignee | Federal Pacific Electric Company |

[54] GROUND FAULT PROTECTION FOR UNGROUNDED SYSTEMS
6 Claims, 3 Drawing Figs.

[52] U.S. Cl.................................................. 317/18, 317/27
[51] Int. Cl................................................... H02h 3/28
[50] Field of Search........................................ 317/18, 18 D, 27, 46

[56] References Cited
UNITED STATES PATENTS
3,158,785  11/1964  Gagniere et al............... 317/18
3,356,939  12/1967  Stevenson .................... 317/18 X

*Primary Examiner*—Robert K. Schaefer
*Assistant Examiner*—William J. Smith
*Attorneys*—Paul S. Martin and Richard M. Rabkin

ABSTRACT: A floating-neutral polyphase distribution system having plural branch lines has ground fault detectors that trip branch-circuit breakers in response to ground faults in different phases of different branch lines. Tripping does not occur in response to a ground fault of a phase in a single branch circuit, but warning signals are provided for such faults.

3,585,452

INVENTOR
ANATOLE J. GOODWIN

BY

ATTORNEY

GROUND FAULT PROTECTION FOR UNGROUNDED SYSTEMS

The present invention relates to alternating current systems of the so-called ungrounded or floating-neutral-type and in particular to protective apparatus for such alternating current systems.

Ungrounded alternating current distribution systems have long been known and recognized for certain prominent advantages. Notably, service can be maintained after a phase-to-ground fault appears. Of course, ground faults should be detected promptly and corrected. When a phase-to-ground fault develops, a greatly increased voltage can develop between each of the healthy phases and ground, a condition that could damage or even puncture the insulation of connected loads and of the distribution cables or bus duct. In case of an intermittent fault or arcing, the voltage between ground and each of the healthy phases can be as high as five or six times the phase voltage. Further, when a phase-to-ground fault develops, there is a shock hazard between the remaining unfaulted phases and ground.

There are two broad classes of ground fault indicators for alternating current systems generally. One form is the "potential" type, and includes a star-connected group of impedances, with a ground connection to the junction of the star. One example is a star-connected group of lamps with a grounded junction. Under normal conditions, each of the lamps merely glows, but in case one of the phases should develop a leakage path or a short circuit to ground, then a corresponding lamp becomes dimmer or goes out while the other lamps become bright. Another type of ground fault detector is current responsive and yields no more than a nominal level of output when there is no leakage or ground fault, but a high level of output appears when a ground fault occurs. This type senses or derives the ground-fault component of the line current and provides a warning of the ground fault. Ideally, it includes a zero-phase sequence current transformer, or differential current transformer as it is sometimes called.

Only the potential type of ground fault detector is useful for indicating a phase-to-ground fault on completely ungrounded alternating current systems. The type of ground fault detectors that depend on sensing the zero-phase sequence current can be used on floating-neutral alternating current systems only by providing the system with an artificial neutral. This is because there is no dependable return path for ground-fault current in the completely ungrounded alternating current system. The potential type of ground fault indicators is the type customarily used for floating-neutral alternating current systems. Where there are multiple distribution lines connected to a common supply bus, a separate ground fault indicator of the potential type is provided for each of the multiple lines. Occurrence of ground faults in any of the phases of different lines would merely be indicated.

It is an object of the present invention to improve floating-neutral alternating current systems, and accordingly a feature of the invention resides in providing ground-fault detecting means for ground faults existing concurrently in different distribution lines of a common bus, where the ground fault detecting means discriminates between ground faults that are between the same phase of different lines and ground, and concurrent ground faults of different distribution lines that are between different phases and ground. This is achieved in the illustrative embodiment of the invention described in detail below by providing ground-fault sensing means of the current-responsive type in each of the several distribution lines of an ungrounded alternating current system. In case of a single-phase-to-ground fault, such current sensing means does not provide substantial output, and the result is the same in case of concurrent ground faults in different distribution lines on a common ungrounded alternating current bus, where the faults are between the same phase and ground. However, there is a substantial response only when there are phase-to-ground faults in different phases of different distribution lines connected to the common ungrounded bus. This distinctive response to this particular fault condition, is utilized pursuant to a feature of the invention to open a circuit interrupter that protects at least one of the fault distribution lines. Such a protective system has the advantage of maintaining in service each of the distribution lines on a common bus, when any one of them should develop a ground fault and when two or more of the distribution lines should develop faults, provided that the faults are all between the same phase and ground. The system is protected automatically in case different-phase grounded faults develop on different lines of a common bus. This is a condition that could cause a large amount of damage to the distribution line because large fault currents can flow from one faulted phase on one line via ground to another faulted phase of another line, where both lines are connected to a common bus. The distinctive response of the ground-fault detectors of the current-responsive type to the special conditions of different-phase faults in different distribution lines causes opening of a protective current interrupter in the system.

Floating-neutral alternating current systems can be protected against the inordinate rise in phase-to-ground voltage that can occur as a result of a phase-to-ground fault by adding an artificial neutral. Where the artificial neutral is used, it is practical to use the current sensing type of ground fault indicator, as is shown in U.S. Pat. No. 3,356,949 issued Dec. 5, 1967 to R. A. Stevenson. The artificial neutral does not convert the system to a grounded-neutral supply since the artificial neutral is proportioned only to "swamp" the capacitive current of the distribution system. It is of limited current-carrying capacity, typically 1 or 2 amperes. A current-sensing type of ground-fault indicator does not cause the service to be interrupted when a ground fault appears. A warning is provided but the service is maintained. The same is true in case multiple ground faults should develop on multiple distribution lines of a common floating-neutral alternating current system. A further object of the invention resides in providing floating-neutral alternating current systems with a form of ground-fault sensing means that responds distinctively to the particular condition of a ground fault between one phase and ground in each of two distribution lines of a common bus, where those faults are between different phases and ground, and in utilizing such distinctive response for promptly interrupting service on at least one of the faulted distribution lines. This object is achieved in an illustrative embodiment of the invention shown in the accompanying drawings and described in detail below by providing each of multiple distribution lines with a current-sensing type of ground fault detector which is set for response to a minimum fault current of a substantially higher magnitude than that carried by the artificial neutral even when a ground fault occurs.

The nature of the invention and its further objects, novel features and advantages will be more fully appreciated from the following detailed description of several embodiments thereof and from the accompanying drawings.

Figure 1:
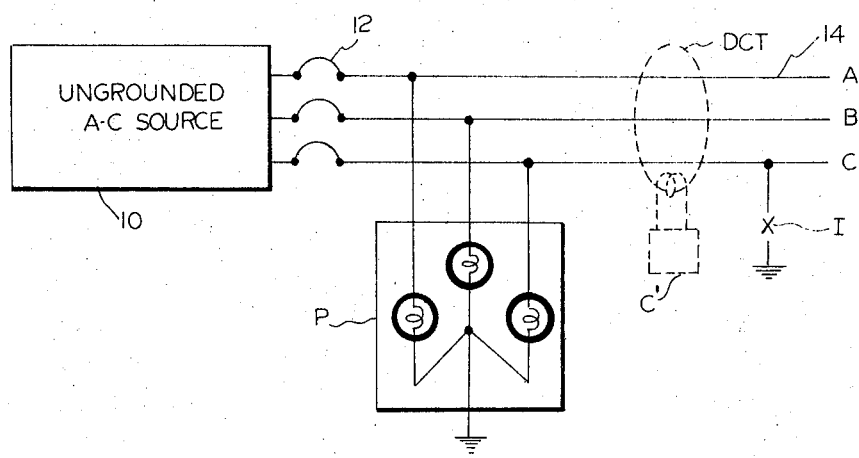
FIG. 1 is a wiring diagram of a prior art floating-neutral alternating current system including a ground-fault indicator.

Referring to FIG. 1 an ungrounded alternating current source 10 is shown having a main circuit interrupter 12 connected to a main bus 14. A potential type ground-fault indicator represented by the wye-connected group of lamps P is connected to main line 14, and its junction is grounded. The showing of unit P is simplified, for it is customary to include dropping resistors, etc., in series with lamps, and various other forms of potential type ground-fault indicators are well known. In case of a ground fault I (either ground leakage or an actual short circuit) between any one of the phases and ground, then the voltage between that phase and ground would decrease and the voltage of the other two phases relative to ground would correspondingly increase with a result that one of the three lamps would fade or go out while the others would become brighter. This provides an indication of the existence of a ground fault and it identifies the faulted phase.

If one were to omit the potential type of ground fault detector P and, instead, if one were to attempt to use a current-type of ground-fault detector C' including a zero phase sequence transformer (at times called a differential current transformer) DCT, then ordinarily there would be no significant output indication in response to the appearance of ground fault I. This is because there is no return path for the current from phase C through the fault to ground, and to the other phases A and B, except via the limited phase-to-ground capacitance of the line conductors. For this reason one skilled in the art would ordinarily avoid the current-sensing type of ground-fault detectors in ungrounded alternating current systems. However, FIG. 2 illustrates the use of the current-sensing type of ground-fault detectors in an ungrounded alternating current system for an important new purpose, as will be seen.

Figure 2:
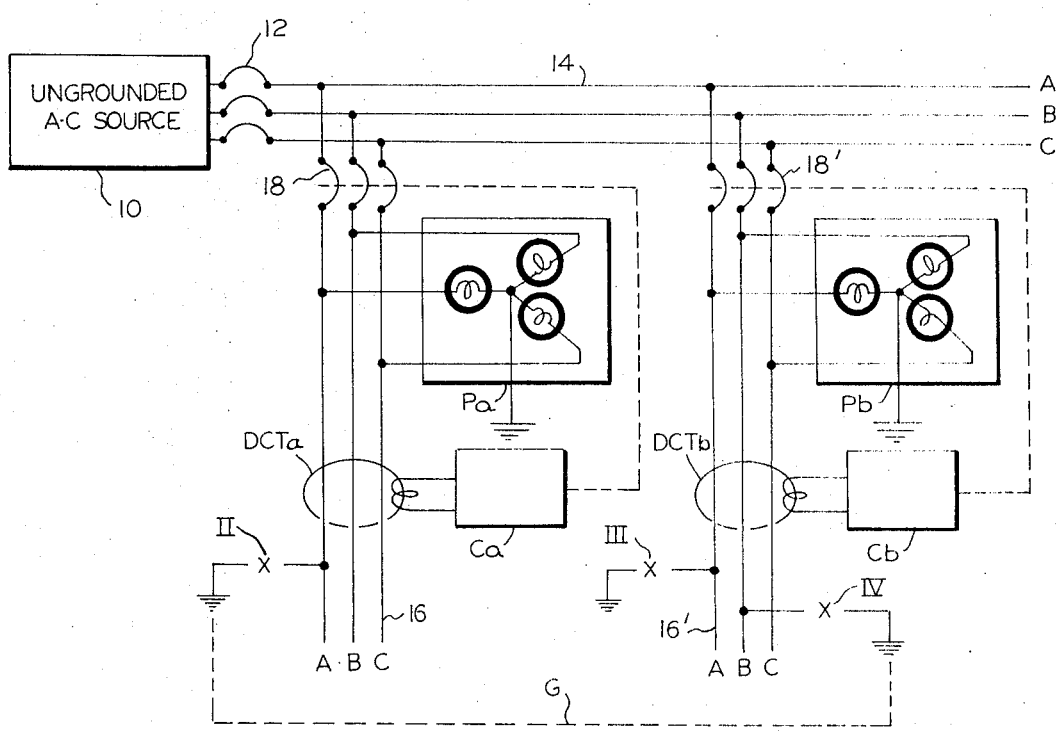
FIG. 2 is a wiring diagram of a floating-neutral alternating current system improved in accordance with features of the present invention.

In FIG. 2 alternating current source 10 is connected via main circuit interrupter 12 to a common bus 14, to which there are connected first and second distribution lines 16 and 16' via respective circuit interrupters 18 and 18'. Potential type ground-fault indicators Pa and Pb are connected to lines 16 and 16' respectively. In addition, ground-fault detectors Ca and Cb of the current-sensing type are coupled to lines 16 and 16' respectively. Detectors Ca and Cb include differential transformers DCT having a toroidal core, for deriving the zero-phase sequence current of the respective line.

In case a ground fault II should develop between phase A and ground in the system of FIG. 2, a warning of such fault would provided by ground-fault indicator Pa. Likewise appearance of a ground-fault III between phase A of distribution line 16' would produce an indication of fault in indicator Pb. Indeed, both indicators might well respond to a ground fault in only one of the lines 16 and 16'.

The concurrent existence of both faults II and III is a condition that should not result in interruption of power service. In case of concurrent ground-faults II and III, neither ground-fault detector Ca nor ground-fault detector Cb would respond (disregarding the effects of ground capacitance of the different lines). With such faults, there is normally no significant zero-phase sequence current to produce an output in either of the zero-phase sequence transformers DCT of detectors Ca and Cb. There is no return current path for ground-fault current of line 16 from phase A and ground, nor is there a return path for the ground-fault current of line 16' from phase A to ground.

A different condition arises in case fault III is replaced by fault IV. The potential type of ground-fault indicators Pa and Pb would both respond. However, those ground-fault indicators do nothing more than to provide a warning of the fault conditions.

The concurrent existence of faults II and IV represents a potentially destructive condition. A current path develops between phase A of line 16, through fault II and ground path G, through fault IV to phase B. This represents a fault-current path between phase A and phase B of two lines that are both connected together at bus 14. Severe damaging currents can develop but, because of the resistance of the ground path G, this fault current would usually be too low to activate the instantaneous overcurrent protective devices of the system. If it is assumed that current interrupters 18 and 18' are circuit breakers with overload protection, then these circuit breakers would ordinarily remain closed since the fault current in all probability does not reach the overcurrent level so as to cause tripping. The differential current-sensing ground-fault detectors Ca and Cb have control couplings (represented by dotted lines) to their respective circuit interrupters 18 and 18'. Where circuit interrupters 18 and 18' are circuit breakers, then such control coupling is, for example, an output connection from each of the detectors to an instantaneous tripping coil of its circuit breaker. In case circuit interrupters 18 and 18' are contactors each having an electromagnet to hold it closed, then detectors Ca and Cb would operate contacts to deenergize such electromagnets and cause opening of the contactors.

In the ungrounded alternating current system of FIG. II the current-sensing type ground-fault detectors Ca and Cb thus has the notable characteristic of discriminating between multiple faults II and III on the same phase of multiple distribution lines 16 and 16', where service is to be maintained, and multiple faults II and IV on different phases of multiple distribution lines 16 and 16' where service is to be interrupted. Various conditions that need not be explored here (e.g., ground capacitance of the cables) can give rise to low level values of output from the zero-phase sequence transformers DCT in FIG. 2, without such low level output signifying a potentially destructive condition. Since some spurious low level of zero-phase sequence current is normal, the detectors Ca and Cb are adjusted to disregard such low level signals from the DCT's. However, in such a system having overload protection set to trip in response to sustained currents of 2,000 amps (for example) the ground-fault current through faults II and IV might well approach 2,000 amps. In that event naturally detectors Ca and Cb would instantly open current interrupters 18 and 18'. In that same system, circuit breakers designed to interrupt the circuit at 1600 amperes with time delay and at 10,000 amperes instantaneously would not protect the system adequately. Detector Ca trips unit 18 instantly at 5 amps.

The foregoing discussion is concerned with floating-neutral alternating current systems that are literally ungrounded. Floating-neutral alternating current systems are also known which are equipped with an artificial neutral. Such systems have a number of important advantages. Prominently, the artificial neutral can be proportioned to "swamp out" the effects of the capacitance-to-ground of the system conductors. See a paper entitled " 'Total Protection' Against Harmful overcurrents on Low Voltage Systems" by the present invention jointly with R. A. Stevenson, presented and distributed at the IEEE Winter Power Meeting, New York, New York, Jan. 29—Feb. 3, 1967. That paper warns against the use of an inductive artificial neutral, because of possible resonances being developed. Resistive artificial neutrals are recommended, capable of carrying a current equal to the current-to-ground of the system due to ground capacitance of the conductors. In typical systems of up to 6000 KVA installed capacity, a 1 to 2 ampere artificial neutral has been shown by experience to be suitable. The capacitive ground current of the system can be measured by first checking the resistance of the system to ground, to be sure there is no appreciable ground leakage; and then, with full load connected, connecting any phase to ground through an ammeter which then reads the capacitive current of the system.

Figure 3:
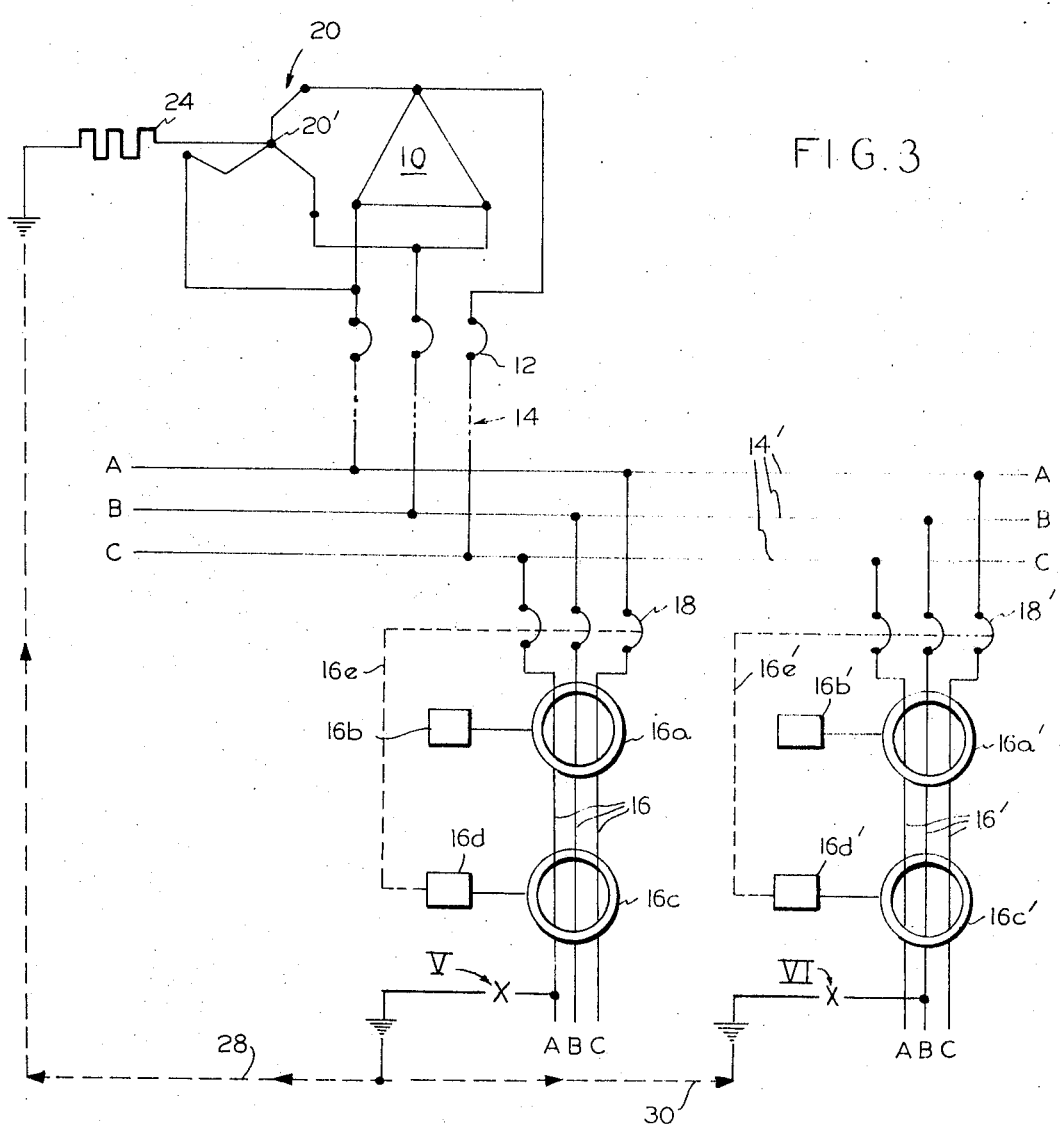
FIG. 3 is the wiring diagram of a floating-neutral alternating current system equipped with an artificial neutral and embodying further features of the present invention.

FIG. 3 illustrates features of the invention in a floating-neutral alternating current system having an artificial neutral. An alternating current source 10 which may be a generator, transmission line, substation or the like is connected through a suitable circuit interrupter 12 and main line 14 to a common bus 14' forming part of the main supply line. A first distribution line 16 and a second distribution line 16' are connected to common bus 14' via circuit interrupters 18 and 18'.

A zigzag transformer 20 has a secondary star junction 20' connected to ground through resistor 24, proportioned as described above. The zigzag star connected transformer provides a high phase-to-phase impedance but has virtually zero impedance to the star connection for ground-fault current. The resistor 24 provides a return-circuit path for a limited amount of ground fault current while the transformer itself presents a high impedance to the system in the absence of a ground fault. In lieu of the preferred zigzag transformer, an artificial neutral can be provided in other ways, as by star-connected resistors shown in the above-mentioned Stevenson patent.

Distribution line 16 is equipped with a zero-phase sequence transformer 16a that links its three-phase conductors and a ground-fault warning device 16b that is responsive to a single-phase fault such as fault V between phase A and ground. A second zero-phase sequence transformer 16c links the three conductors of distribution line 16, and provides a signal for a control device 16d that controls the opening of circuit interrupter 18. Units 16b and 16d may be of the same construction as that shown in Stevenson Pat. 3,356,939, but these units have very different levels of response to zero-phase sequence current. Circuit interrupter 18 advantageously is a circuit breaker equipped with manual overload responsive tripping devices, commonly including tripping devices arranged to trip instantaneously in response to short circuits, to trip after a short delay in response to severe overcurrents and to trip after an inverse-time delay in response to persistent moderate overloads. With such a circuit interrupter, device 16d ideally controls the instantaneous tripping device of the circuit breaker 18 or an auxiliary instantaneous tripping device. Circuit interrupter 18 also represents a contactor held closed by an electromagnet, and then control device 16d controls switching means to interrupt the circuit of the closing electromagnet and this causes opening of interrupter 18. The dotted line 16e represents any suitable form of control of circuit interrupter 18 provided by control device 16d.

Distribution line 16' is similarly equipped with zero-phase sequence transformer 16a', fault indicator 16b', zero-phase sequence transformer 16c', and a control device 16d' with its control coupling 16e' to circuit interrupter 18'.

In operation, the occurrence of a ground fault between phase A of line 16 and ground will cause indicator 16b to provide a warning of such single phase-to-ground fault, where the fault current exceeds a minimum level above that representing normal leakage and unbalanced capacitances-to-ground of line 16. By like token when a fault VI develops between phase B and ground when there is no fault V, indicator 16b' provides a separate indication of such fault. The current level for which indicators 16b and 16b' are responsive exceeds the minimum level that signifies a fault, but is within the limit of current that could be carried by path 28 and the artificial neutral circuit of resistor 24 in the extreme case of a phase-to-ground short circuit. The maximum current carried by the artificial neutral in case of one phase-to-ground fault is not increased and may even decrease where there are faults between two phases and ground.

It is possible for fault VI on line 16' to develop between phase B and ground, after fault V on line 16 has occurred between phase A and ground on line 16. In that case, there is an additional ground-current path 30 from phase A of line 16, to ground, to phase B of line 16'. This current is in no way limited to the level for which the artificial-neutral network is designed. This condition may well support arcing at each or both faults; and any such arcing could cause severe damage to the distribution system. Zero-phase sequence transformers 16c and 16c' provide an output current for energizing control devices 16d and 16d' to cause opening of their respective circuit interrupters 18 and 18'. The minimum current level for which devices 16d and 16d' are responsive is set well above the maximum current level that could be carried by the artificial neutral. In an example this is two and one-half to five times the current level for which devices 16b and 16b' are set.

In such a system the occurrence of a fault to ground of a single phase in one distribution line 16 during the existence of a fault between the same phase and ground of another distribution line 16' will only cause the operation of the ground-fault indicators 16b and 16b'. This does not interrupt the service but only calls attention to the hazardous condition. Operation of the indicators 16b and 16b' also occurs in response to single-phase ground faults in plural phases of the same or different distribution lines. Instantaneous operation of circuit interrupters 18 and 18' follows in response to occurrence of faults V and VI between different phases and ground of the different distribution lines.

Many variations in matters of detail will be readily apparent to those skilled in the art. Thus, while separate zero-phase sequence transformers 16a and 16c are shown for the ground-fault indicator 16b and for the control device 16d to activate the circuit interrupter 18, a common zero-phase sequence transformer could be utilized to provide ground-fault signals both for indicator 16b and for control device 16d. The system described is for three-phase distribution, but the DCT's could link the two phase conductors of a single-phase power line. Still further modifications of the invention as represented in the foregoing description and in the drawings will be readily apparent to those skilled in the art. Consequently, the invention should be construed broadly in accordance with its full spirit and scope.

I claim:

1. In an alternating-current distribution system, a floating-neutral alternating-current supply line, plural distribution lines extending from said supply line, each said line having plural phase conductors, a circuit interrupter in at least one of said plural distribution lines, and means for controlling said interrupter, said control means including a ground-fault detector of the current-responsive type coupled to said one distribution line, said control means being effective for causing opening of said circuit interrupter only in response to ground-fault current that is substantially greater than the maximum ground-fault current that could result from a single phase-to-ground fault, thereby providing protection against such greater ground-fault current that could develop upon occurrence of concurrent phase-to-ground faults in different phases of said one distribution line and of another of said distribution lines.

2. Apparatus in accordance with claim 1, further including means connected to said alternating-current supply line for providing an artificial neutral of limited current capacity for all said distribution lines proportioned to suppress the tendency of an ungrounded system to develop large values of phase-to-ground voltage at the unfaulted phases upon occurrence of a phase-to-ground fault, the minumum response level of said control means for causing said circuit interrupter to open being substantially higher than the maximum level of ground-fault current drawn by said artificial neutral means during a single-phase fault to ground.

3. Apparatus in accordance with claim 1, wherein said alternating-current supply is a three-phase supply and wherein each of said distribution lines includes a current-responsive ground-fault detector and a circuit interrupter controlled thereby as aforesaid.

4. Apparatus in accordance with claim 1, further including means connected to said alternating-current supply line for providing an artificial neutral of limited current capacity for all said distribution lines effective upon occurrence of a phase-to-ground fault in one of said lines to develop a limited level of ground-fault current, and said control means having a response level effective to cause opening of said one circuit interrupter only at ground fault currents greatly in excess of the ground fault current passed by said artificial neutral.

5. Apparatus in accordance with claim 1, further including warning means coupled to each of said distribution lines and responsive to an amount of ground-fault current above a threshold that is substantially below the level that is operative to cause opening of said circuit interrupter for indicating the presence of a fault between any one phase and ground in a respective one of said distribution lines.

6. Apparatus in accordance with claim 4, further including warning means coupled to each of said distribution lines and responsive to an amount of ground-fault current above a threshold that is substantially below the limited level of ground fault current passed by said artificial neutral for indicating the presence of a fault between any one phase and ground in a respective one of said distribution lines.